US007720870B2

(12) United States Patent
Barbosa et al.

(10) Patent No.: US 7,720,870 B2
(45) Date of Patent: May 18, 2010

(54) METHOD AND SYSTEM FOR QUANTIFYING THE QUALITY OF SEARCH RESULTS BASED ON COHESION

(75) Inventors: Luciano Barbosa, Salt Lake City, UT (US); Flavio Junqueira, Barcelona (ES); Vassilis Plachouras, Barcelona (ES); Ricardo Baeza-Yates, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 369 days.

(21) Appl. No.: 11/959,182

(22) Filed: Dec. 18, 2007

(65) Prior Publication Data

US 2009/0157652 A1   Jun. 18, 2009

(51) Int. Cl.
*G06F 17/30*       (2006.01)
(52) U.S. Cl. .................. 707/796; 715/229; 717/122
(58) Field of Classification Search ............... 707/796; 715/229; 717/122
See application file for complete search history.

(56) References Cited

U.S. PATENT DOCUMENTS

| 6,804,665 | B2* | 10/2004 | Kreulen et al. ............. 707/3 |
| 6,910,037 | B2* | 6/2005 | Gutta et al. ................ 707/5 |
| 7,024,400 | B2* | 4/2006 | Tokuda et al. ............. 706/56 |
| 7,499,934 | B2* | 3/2009 | Zhang et al. ............... 707/101 |
| 2006/0271536 | A1* | 11/2006 | Zhang et al. ............... 707/5 |
| 2006/0294101 | A1* | 12/2006 | Wnek ........................ 707/7 |

OTHER PUBLICATIONS

Brin, S., et al., "The Anatomy of a large-scale hyper textual Web Search engine", Computer Networks and ISDN Systems, 1998, 20 pages.
Callan, J.P., et al., "Searching distributed collections with inference networks", In Proceedings of SIGIR, 1995, 8 pages.

(Continued)

*Primary Examiner*—Shahid A Alam
*Assistant Examiner*—Noosha Arjomandi
(74) *Attorney, Agent, or Firm*—Hickman Palermo Truong & Becker LLP; Adam C. Stone (57) ABSTRACT

A method and system for quantifying the quality of search results from a search engine based on cohesion. The method and system include modeling a set of search engine search results as a cluster and measuring the cohesion of the cluster. In an embodiment, the cohesion of the cluster is the average similarity between the cluster elements to a centroid vector. The centroid vector is the average of the weights of the vectors of the cluster. The similarity between the centroid vector and the cluster's elements is the cosine similarity measure. Each document in the set of search results is represented by a vector where each cell of the vector represents a stemmed word. Each cell has a cell value which is the frequency of the corresponding stemmed word in a document multiplied by a weight that takes into account the location of the stemmed word within the document.

24 Claims, 7 Drawing Sheets

OTHER PUBLICATIONS

Cronen-Townsend, S., et al., "Predicting Query Performance", In Proceedings of SIGIR, 2002, 8 pages.

Gravano, L., et al., "Generalizing GlOSS to Vector-Space Databases and Broker Hierarchies", In Proceedings of VLDB, 1995, 32 pages.

Leskovec, J., et al., "Web Projections: Learning from Contextual Subgraphs of the Web", In Proceedings of WWW, 2007, 10 pages.

Tan, P.N., et al., "Introduction to Data Mining", Addison-Wesley, 2006, 82 pages.

Yom-Tov, E., et al., "Learning to estimate query difficulty: including applications to missing content detection and distributed information retrieval", In Proceedings of SIGIR, 2005, 8 pages.

\* cited by examiner

METHOD AND SYSTEM FOR QUANTIFYING THE QUALITY OF SEARCH RESULTS BASED ON COHESION

FIELD OF EMBODIMENT

The present invention relates generally to search engines, and more particularly to a method and system for quantifying the quality of search engine search results based on cohesion.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The ultimate goal of any search engine is returning relevant results in response to a query. Generally, upon receiving a query from a user, a search engine searches its index for documents that match the query and then employs a ranking function to order the list of matching documents before presenting the list to the user. How a search engine ranking function decides which documents are the best matches, and what order the results should be shown in, varies widely from one search engine to another. Indeed, tuning a search engine ranking function to return relevant results for every search query is a challenging task. The task is especially challenging for Internet search engines as the numbers of documents and users are large and continuously increasing over time.

As search engines rely upon ranking functions to order results presented to the user, many techniques have been proposed to improve the quality of search engine ranking functions. Recently, however, there has been more attention on the automatic evaluation of the quality of search engine search results. Techniques for automatic evaluation enable, for example, search engines to process difficult queries in different ways, or to ask the user for further disambiguation information.

One approach for assessing search result quality is disclosed in the paper entitled "Web Projections: Learning from Contextual Subgraphs of the Web", by J. Leskovec, S. Dumais, and E. Horvitz, which is published on the Internet at the website for the Sixteenth International World Wide Web Conference, held in Banff, Alberta, Canada, from May 8-12, 2007. The Leskovec, et al. approach uses a supervised learning approach. In a supervised learning approach, a prediction is made as to the quality of search results based on training data. The training data typically consists of pairs of search queries and search results where each pair is labeled with a human-assigned relevance score. The task then, under the supervised learning approach, is to predict, accurately, the quality of search results for a valid search query after having been provided with a number of training examples.

While the supervised learning approach can provide an accurate predication as to the quality of search results, the supervised learning approach suffers from a drawback. Namely, supervised learning requires the creation and labeling of training data. For example, a system in which a typical supervised learning approach is used might require training data comprising thousands of queries, each with a corresponding set of search results and each labeled with a human-assigned relevance score. In the context of Internet search engines, the task of maintaining training data is especially demanding because the numbers of documents and queries are large and continuously increasing over time. Therefore, there is a need to quantify, accurately, the quality of search results without having to maintain training data as required by a supervised learning approach.

Another approach for assessing search result quality is disclosed in the paper entitled "Predicting Query Performance", by S. Cronen-Townsend, Y. Zhou, and W. B. Croft, which is published on the Internet at the website for the Twenty Fifth Annual International ACM SIGIR Conference on Research and Development in Information Retrieval, held in Tampere, Finland, from Aug. 11-15, 2002. Cronen-Townsend et al. employ an unsupervised learning approach. An unsupervised learning approach does not suffer from the drawback of a supervised learning approach in that the unsupervised learning approach does not require the creation and labeling of training data. However, previous unsupervised learning approaches for assessing search result quality required access to the whole document collection that is searchable by the search engine. For example, the Cronen-Townsend et al. approach infers the quality of results by calculating the divergence of the language model of the top ranked documents from the language model of the whole document collection. The task of calculating is especially challenging in the context of Internet search engines where the size of the whole document collection is large and continuously increasing. Therefore, there is a need to assess the quality of search results that does not require access to the entire document collection.

One application of techniques for assessing search result quality is query routing in distributed search systems. Query routing consists of selecting the best search engines that are able to respond to a particular query. In query routing, a broker decides which search engine to send the query to among multiple search engines that may respond to the query. Previous approaches to query routing ranked search engines based on statistics of the terms contained in the query.

For example, one approach for query routing that uses a statistics database, known in the art as CORI, is disclosed in the paper entitled "Searching distributed collections with inference networks", by J. P. Callan, Z. Lu, and W. B. Croft, which was presented at the Eighteenth Annual International ACM SIGIR Conference on Research and Development in Information Retrieval, held in Seattle, Wash., from Jul. 9-13, 1995. For a given query, CORI ranks the source search engines based on df.icf for document collections, where df represents the document frequency in a particular search engine's document collection and icf the inverse of the frequency of the term in all collections.

Another approach that uses term statistics in the document collections is disclosed in the paper entitled "Generalizing Gloss to Vector-Space Databases and Broker Hierarchies", by L. Gravano and H. Garcia Molina, which was presented at the Twenty First International Conference on Very Large Data Bases, from Sep. 11-15, 1995, held in Zurich, Switzerland. Gloss uses term statistics in the collection to infer the rank of sources for a given query. Gloss requires two vectors to estimate the rank: the document frequency of the terms in each collection and the sum of weight of each term over all documents in the collection. Based on these vectors, Gloss proposes two estimators to predict the number of documents in a document collection having a similarity with a query greater than a threshold l. One estimator, Max(l), assumes the highest level of co-occurrence of the query terms in the database documents. The second estimator, Sum(l), assumes the terms in the query do not appear together in any database document.

Both the CORI approach and the Gloss approach do not take into account the search result quality when selecting sources. Source search engines with similar statistics about the query terms have the same importance to the given query. However, as the search engines can employ different ranking functions, the quality of search results can be different. Therefore, there is a need for better source selection for search queries that takes into account the quality of the ranking functions of each search engine.

Another application of techniques for assessing search result quality is the aggregation of search results by a meta-search engine. A meta-search engine or search engine aggregator is a type of search engine that submits user search queries to other search engines and returns the results or portions thereof from each of the other search engines. Meta-search engines enable a user to enter and submit a query once and obtain results from many information sources simultaneously. Current approaches for aggregating search results from multiple search engines do not take into account the quality of the ranking function of each search engine.

Based on the foregoing, it is clearly desirable to quantify the quality of search results without requiring creation and labeling of training data and without requiring access to the whole searchable document collection. It is further desirable to route queries in a manner that takes into account the quality of search results to select source search engines. Finally, it is desirable to aggregate search results from multiple search engines in a manner that takes into account the quality of the ranking functions employed by the search engines.

SUMMARY

New approaches and applications thereof are provided for quantifying the quality of search results based on cohesion.

According to one embodiment of the present invention, results from a search engine are modeled as a cluster of vectors. The cohesion of the cluster is measured. The cohesion of the cluster is the average similarity of the cluster elements to the cluster's centroid vector. The centroid vector of the cluster is the average of the weights in the elements in the cluster. The similarity of the centroid vector to the cluster's elements is the cosine similarity measure defined in the Vector Space Model. To calculate the cohesion, each document in the search result is represented by a vector where each cell of the vector represents a stemmed word. For each cell, the cell value is the frequency of the corresponding term (i.e., stemmed word) in the document multiplied by a weight that takes into consideration the location of the term within the document. The resulting cohesion value quantifies the degree of similarity among the results in the result set. A high cohesion value implies a set of search results that that has very similar properties, whereas a low cohesion value implies a set of results that do not have properties in common. Based on the assumption that relevant documents are more similar to each other than non-relevant documents, the cohesion value provides an accurate quantification of the quality of search results returned from a search engine in response to a particular query.

Other embodiments of the present invention will be apparent from the accompanying drawings and from the following detailed description.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches and applications thereof for quantifying the quality of search results based on cohesion are provided. In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Cohesion

Figure 1:
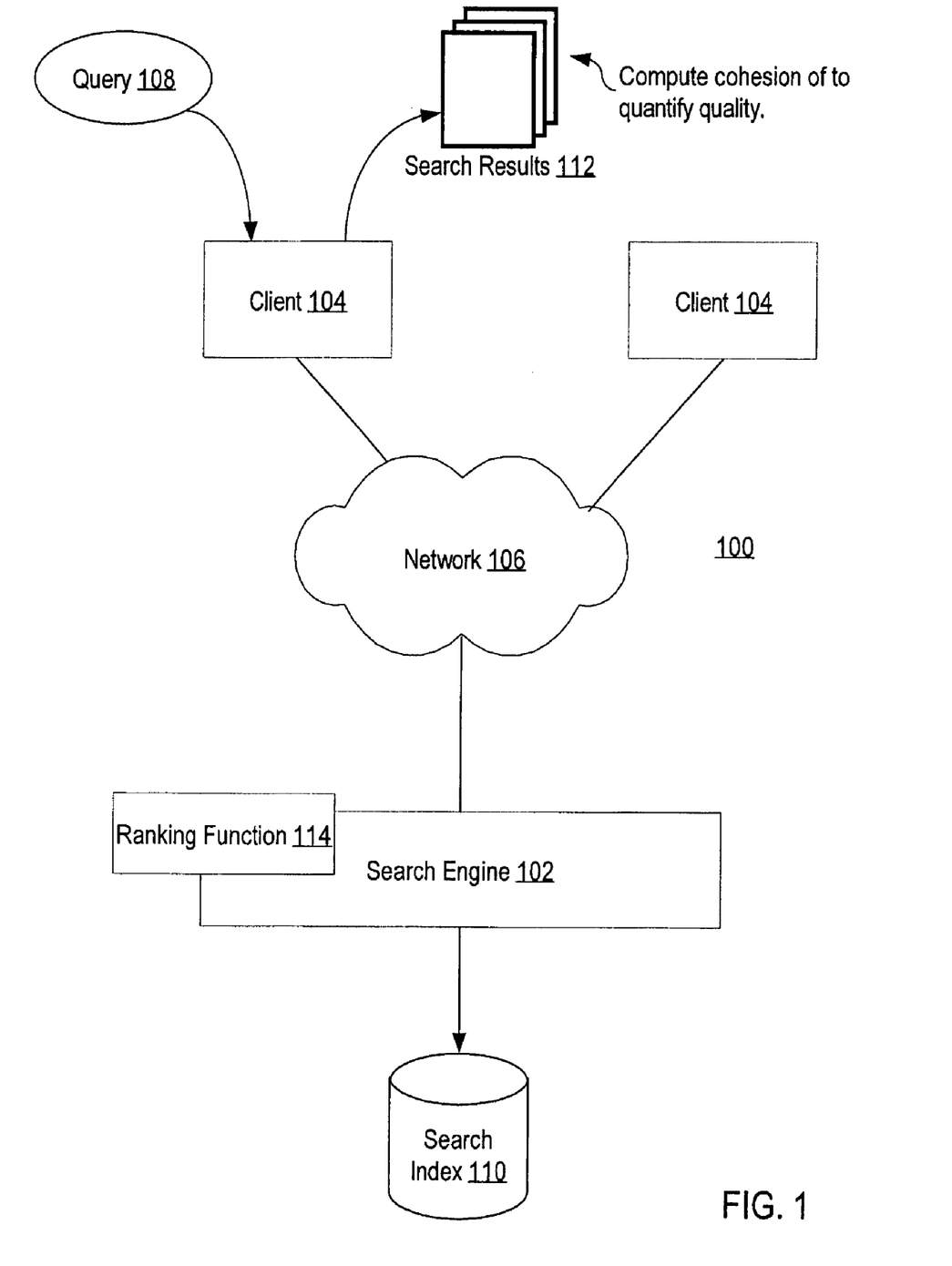
FIG. 1 is a block diagram that illustrates a network in which techniques for quantifying the quality of search results may be applied, according to an embodiment.

FIG. 1 illustrates an example networked environment 100 in which an embodiment of the present invention may be implemented. Client computer 104 is communicatively coupled to search engine 102 through data network 106, such as, for example, the Internet, a wide area network, or a local area network. Client computer 104 typically contains a web browser or other software that enables a user to interface with search engine 102. The user submits search query 108 to search engine 102. In response to receiving query 108, search engine 102 examines search index 110 and returns a set of matching documents, search results 112, to client 104. Since there may be thousands or even millions of documents that match query 108, search engine 102 may employ ranking function 114 to rank search results 112 such that the "best" or most relevant results are shown to the user first. According to an embodiment, the quality of ranking function 114 may be quantified by computing the cohesion of search results 112.

Search engine 102 is an information retrieval system designed to help find information stored on a computer system. Generally, a search engine provides an interface that enables a user to specify criteria about a topic of interest and have the search engine find matching items. The criteria provided by the user are known as a search query. For example, in text-based search engines, a search query may be expressed as set of one or more words that identify the desired topic to which one or more documents may pertain. While search engines may be applied in a variety of contexts, search engines are especially useful for locating resources that are accessible through the Internet. Yahoo!, Google, and Microsoft Network are examples of widely known, commercial Internet search engines. One can use an Internet search engine to generate a list of Universal Resource Locators (URLs) and/or Hypertext Markup Language (HTML) links to files, or pages, that are likely to be of interest. Such files, or pages, may be generally referred to as documents. Documents may contain text, images, and/or other data that is meaningful to humans or computers. For sake of simplicity, "document" is used herein to refer to a URL or HTML link to a file or page as well as the file or page itself.

Although embodiments described herein are described with respect to Internet search engines, certain embodiments of the invention may be applied in the context of any text-based search engine. Generally, search engine 102 may be any computer-implemented information retrieval system designed to search for information in resources stored on a computer. Internet search engines are one example of such an information retrieval system. A desktop search program, which enables a user to find files that are stored on a desktop computer and that match a given query, is another example of such an information retrieval system. Typically, resources are documents, such as web pages, which contain information that is meaningful to both humans and computers. However, resources may include any computer-readable data that is meaningful to humans or computers. To find information that matches a given query, search engine 102 may search for matching information in documents, in metadata which describes documents, or in a database such as a search index 110.

Search engine 102 accepts search query 108, which represents an information need of a user. Generally, an information need of a user is a topic of interest of the user. Typically, search query 108 is a sequence of one or more words that represent the user's topic of interest. One or more documents may pertain to the user's topic of interest. For example, a user might be interested in search results related to the scientific paper "Engineering a multi-purpose test collection for Web retrieval experiments." The user may enter the search query "Engineering a multi-purpose test collection," without quotes, to represent the information need. However, search query 108 may include any data that represents an information need of a user and that may be submitted to search engine 102. A user may submit search query 108 to search engine 102 through a user interface provided by search engine 102. Alternatively, another computer may submit search query 108 through an application interface provided by search engine 102. Typically, the user submits query 108 to search engine 102 using a web browser or other software that enables a user to interface with search engine 102.

Client computer 104 may be communicatively coupled to search engine 102 through data network 106 as illustrated in FIG. 1. Data network 106 may be any network suitable for communicating data between client computer 104 and search engine 102; for example, data network 106 may be the Internet. Alternatively, a single computer may provide the functionality of client computer 104 and search engine 102. For example, the desktop search application described previously might provide such functionality. A user uses an application (e.g., a web browser) executing on client computer 104 to interface with search engine 102 and submit query 108 to search engine 102. In response to receiving query 108 from client computer 104, search engine 102 returns search results 112 to client computer 104. An application (e.g., the same web browser used to submit query 108 to search engine 102) executing on client computer 104 displays search results 112 to the user.

Search results 112 returned by search engine 102 may be a list of documents that match query 108. The list may be comprised of Universal Resource Locators (URLs) and/or Hypertext Markup Language (HTML) links to files, or pages available on a network. Additionally, the contents of the documents in the list may be returned as part of search results 112. Alternatively, since the contents of the documents may be large, a snippet or a digest of contents of the documents may be returned. For example, most Internet search engines return, as part of the search results, a list of URLs and/or HTML links to documents. Along with each such URL and/or HTML link, most Internet search engines also return a representative portion of the document to which that URL and/or HTML link corresponds. The representative portion might be no longer than one or two sentences. When displayed to the user as part of search results 112, the representative portion provides an indication of the relevancy of the document to the user's information need. For sake of simplicity, "document" is used herein to refer to the entire content of a document as well as a representative portion, or snippet, of a document.

Search results 112 may or may not be relevant to the user's information need. Referring to the previous example, where the user was interested in search results related to the scientific paper "Engineering a multi-purpose test collection for Web retrieval experiments," search results 112 (returned in response to the query "Engineering a multi-purpose test collection," without quotes) may contain documents that are relevant to the user's information need and documents that are not. A search engine may return a non-relevant document as part of the search results if the document contains one or more query-specified terms but otherwise does not contain information about the scientific paper in which the user is interested. Therefore, most search engines employ a ranking function to order a list of documents before presenting the list to a user. To order a list of documents, a search engine may assign a rank to each document in the list. When a search engine sorts the list by rank, the search engine may place a document with a relatively higher rank closer to the head of the list than a document with a relatively lower rank. The user, when presented with the sorted list, sees the most highly ranked documents first. The order in which search results 112 are presented to the user is indicative of the quality of the ranking function 114 employed by search engine 102. A high quality ranking function will cause a search engine to present, to the user, relevant (or more relevant) documents before irrelevant (or less relevant) documents. Relevant documents are those that are related to the user's information need. Irrelevant documents are documents that may contain some or all of the terms specified in query 108, yet are not related to the user's information need.

Figure 2:
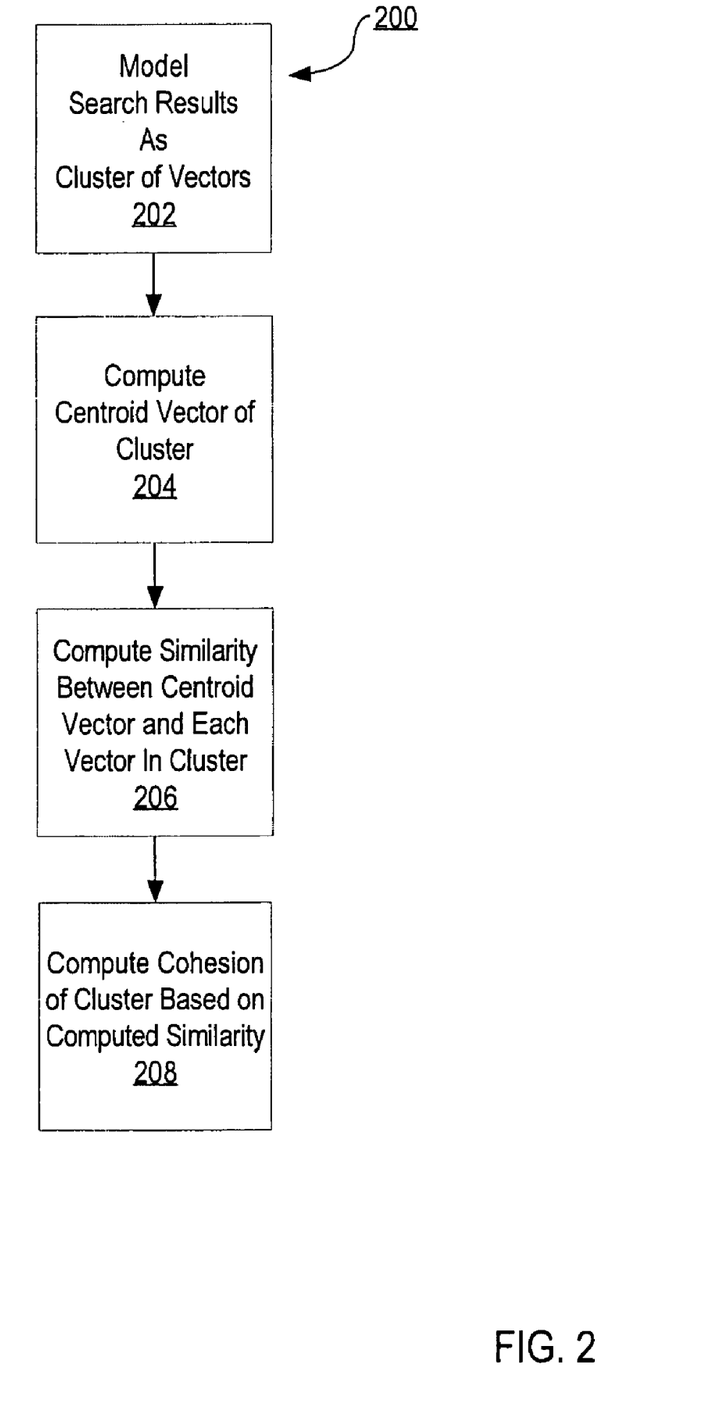
FIG. 2 is a flowchart that illustrates a process for quantifying the quality of search results, according to an embodiment.

FIG. 2 is a flowchart that illustrates a method 200 for quantifying the quality of search results based on cohesion, according to an embodiment of the invention. To quantify the quality of a set of search results, the search results are modeled as a cluster of vectors and the cohesion of the cluster is computed according to method 200. Generally, a cluster is a group of elements related to each other according to some similarity metric. A vector may be represented in the volatile or non-volatile memory of a computer as an array of numbers or a similar data structure. Cohesion is used to measure the degree of similarity among the vectors of the cluster. A high cohesion value implies a set of search results that have very similar properties, whereas a low cohesion value implies a set of search results that do not have properties in common. Relying on the assumption that closely associated documents tend to be relevant to the same query, the quality of search results are quantified by calculating the cohesion value of the cluster. Cohesion accurately serves as a metric for quantifying the quality of search results because high quality results have high cohesion.

In one implementation, client computer 104 obtains a set of search results R from a search engine in response to that search engine receiving query Q. Client computer 104 computes the cohesion of search results R by performing method 200. Client computer 104 contains one or more processors for executing one or more sequences of instructions contained in volatile or non-volatile memory of client computer 104. Such instructions may be read into memory of client computer 104 from another computer-readable storage medium, such as a hard disk or flash memory. Execution of sequences of instructions contained in memory of client computer 104 causes the one or more processors of client computer 104 to perform the method steps of method 200. In alternative embodiments, hard-wired circuitry may be used in place of or in combination with software instructions to implement the invention. Thus, embodiments of the invention are not limited to any specific combination of hardware circuitry and software.

While client computer 104 is an example of a computer system that may perform method 200, method 200 may be implemented on any computer system that contains a processor for executing one or more sequences of instructions. For example, method 200 may be implemented on search engine 102 or a network device that exists on the network path between client computer 104 and search engine 102. Thus, embodiments of the invention are not limited to any specific type of computer system.

In block 202, search results R are modeled as a cluster of vectors C. Each vector in cluster C represents a document returned in result set R. Each cell of each of the vectors represents a word from set of documents returned in result set R. Each cell has a cell value. The cell value of each cell is calculated as the frequency of the corresponding word in a document multiplied by a weight that takes into account the location of the word within the document. For example, if the document is an HTML document, weights may be assigned according to whether the word appears in the title, the URL, or the body of the document.

In process 204, a centroid vector $\vec{c}$ of cluster C is computed. According to an embodiment, cohesion of cluster C is computed as the average similarity between the cluster elements to a prototype, or centroid of the cluster. To determine centroid vector $\vec{c}$ of cluster C, the average of the weights of the elements of cluster C are computed. Equation 1 below may be used to compute centroid vector $\vec{c}$ according to one embodiment of the invention. However, other techniques for generating centroid vector $\vec{c}$ may be used in addition to, or instead of, the techniques described herein. For example, centroid vector $\vec{c}$ may be computed as the median of the weights of the elements of cluster C.

$$\vec{c} = \left( \frac{\sum \vec{x} \in C^{\vec{x}}}{|C|} \right) \quad (1)$$

Figure 3:
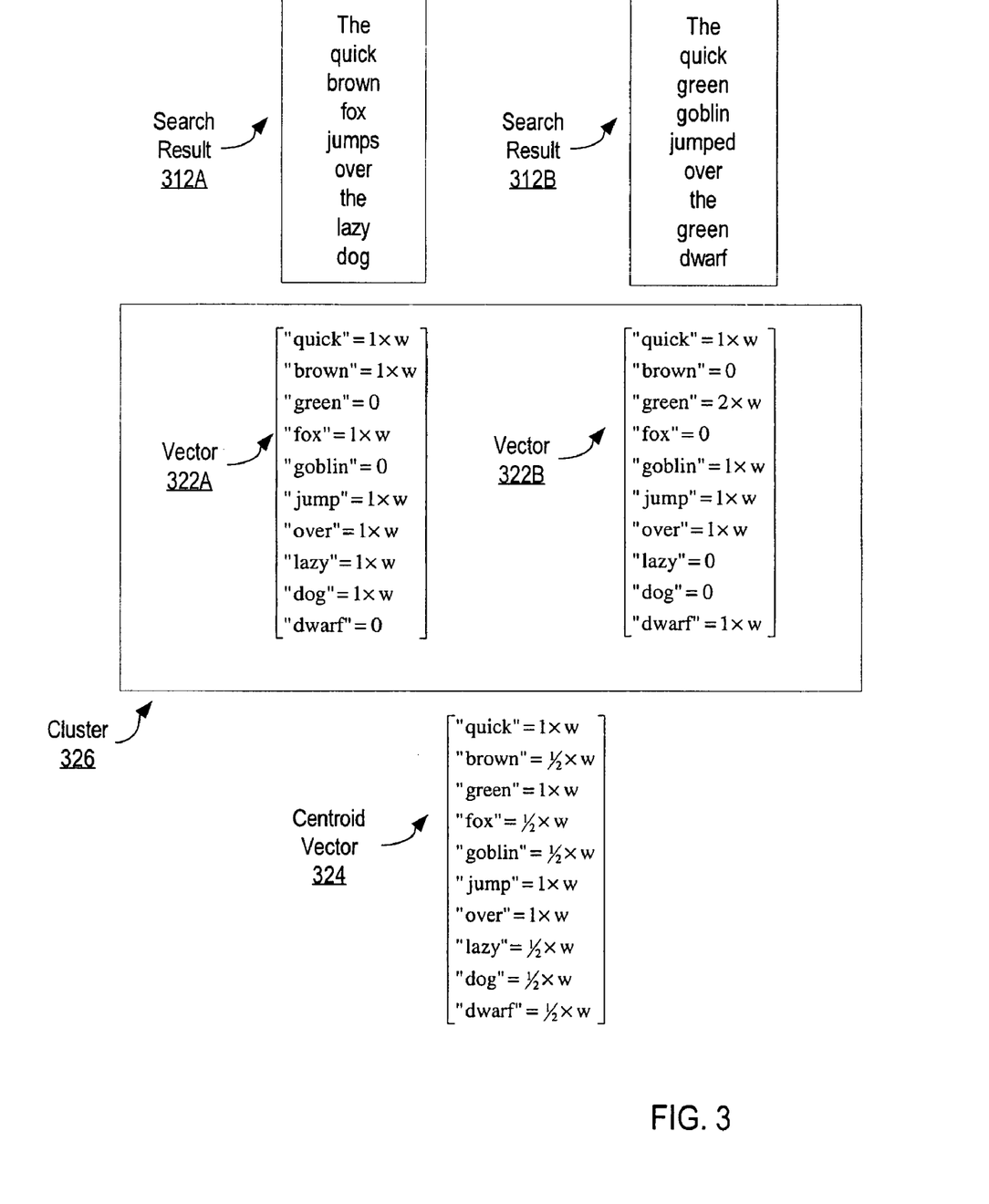
FIG. 3 is a block diagram that illustrates by example how search results may be modeled as a cluster of vectors and how a centroid vector of the cluster of vectors may be computed, according to an embodiment.

FIG. 3 illustrates, by an example, how search results may be modeled as a cluster of vectors, according to an embodiment of the invention. In the example, search results 312A and 312B are modeled as the clusters of vectors 322A and 322B. Vector 322A models search result 312A. Vector 322B models search result 312B. Search result 312A represents a document containing the text "The quick brown fox jumps over the lazy dog." Search result 312B represents a document containing the text "The quick green goblin jumped over the green dwarf." Together, vectors 322A and 322B model search results 312A and 312B as a cluster.

According to an embodiment, each cell of each of the vectors represents a unique stemmed word from the union of all stemmed words from all documents returned in the result set. Thus, the dimensionality of each vector is the number of unique stemmed words in the set of documents that comprises the result set. Accordingly, each cell of vectors 322A and 322B represents a unique stemmed word from the set of search results 312A and 312B. If a stemmed word appears in a document, then the vector cell value for the word is the frequency of the word in the document multiplied by a weight that takes into account the location of the word within the document. For example, the word "green" appears twice in the body of the document represented by search result 312B. Accordingly, the vector cell value for "green" in vector 322B is 2×w, where w represents the location-weight assigned to a word that appears in the body of a document. The location of a word within a document is taken into account because not all terms in a document are equally important. For example, according to one embodiment of the invention, a word found in the title of a web page document would be given a greater weight than the same word found in the body of the document. If a stemmed word does not appear in a document, then the vector cell value for the word is zero. For example, the word "goblin" does not appear in the document represented by search result 312A. Accordingly, the vector cell value for "goblin" in vector 322A is zero.

According to one embodiment of the invention, a word may be represented by the stem or root part of the word in order to take into account inflected variants of the word. For example, the words "jumps" and "jumped" are found in the documents represented by search results 312A and 312B. The stem "jump" is used in vectors 322A and 322B to represent the plural form "jumps" found in the document represented by search result 312A and the past-tense form "jumped" found in the document represented by search result 312B. Cohesion may be computed by representing stemmed words instead of words in their un-stemmed form. However, the cohesion of a cluster may be computed by representing words in those words' un-stemmed form as they exist in search result documents.

According to one embodiment of the invention, some words in the set of documents might not be represented in the set of vectors comprising the cluster. For example, the article "the" found in the documents represented by search results 312A and 312B is not represented in vector 322A or 322B. Such an approach may be used when the unrepresented word has little relevance to the search query. For example, articles "a," "an," and "the," and prepositions, which often have little relevance to the search query, may be omitted from the cluster model.

Referring to FIG. 3, centroid vector 324 is the centroid vector of the cluster 326 that comprises vectors 322A and 322B. According to an embodiment of the invention, centroid vector 324 is computed as the average of the weights of the vectors of cluster 326. To compute the cell value of a cell in centroid vector 324, the cell values from each cell in each of the vectors are summed and then divided by the number of vectors in cluster 326. For example, the cell value for the stemmed word "brown" in centroid vector 324 is computed by summing the cell values for "brown" in vectors 312A and 312B and then dividing that sum by two, the number of vectors in cluster 326, to give ½×w. The resulting cell value in the centroid vector takes into account any weight multiplier applied to the summed cell values. For example, the cell value for "brown" in centroid vector 324 is ½×w, where w takes into account the weight applied to the cell value for "brown" in vector 322A.

Returning to FIG. 2, in block 206, the similarity between centroid vector $\vec{c}$ and each vector in cluster C is computed.

According to an embodiment, the similarity between centroid vector $\vec{c}$ and each vector in cluster C is the cosine similarity measure defined in the Vector Space Model. Equation 2 may be used to compute the similarity between centroid vector $\vec{c}$ and a vector element $\vec{d}$ of cluster C according to an embodiment. The cosine distance between vectors $\vec{d}$ and $\vec{c}$ is computed by dividing the dot product of the vectors by the product of their lengths. However, other techniques for computing the similarity between a vector element $\vec{d}$ of cluster C and centroid vector $\vec{c}$ may be used in addition to, or instead of, the techniques described above.

$$\text{similarity}(\vec{d}, \vec{c}) = \frac{\vec{d} \cdot \vec{c}}{\|\vec{d}\| \times \|\vec{c}\|} \qquad (2)$$

The operations of block 206, if performed relative to the vectors illustrated in FIG. 3, would involve computing both (a) the cosine similarity of vector 322A to centroid vector 324 and (b) the cosine similarity of vector 322B to centroid vector 324. As show in Equation 2, the cosine similarity of the two vectors is the dot product of the vectors divided by the product of the norms of both vectors, where the norm of a vector is the Euclidean norm. The resulting similarity is a number between zero and one, where zero indicates that the vectors are not similar in any respect and one indicates that the vectors are identical. For example, the similarity between vector 322A and centroid vector 324 is calculated as follows:

$\vec{d}$ is vector 322A of FIG. 3.

$\vec{c}$ is centroid vector 324 of FIG. 3.

$\vec{d} \cdot$ $\vec{c} = (1 \times 1) + (1 \times \frac{1}{2}) + (0 \times 1) + (1 \times \frac{1}{2}) + (0 \times \frac{1}{2}) + (1 \times 1) + (1 \times 1) + (1 \times \frac{1}{2}) + (1 \times \frac{1}{2}) + (0 \times \frac{1}{2}) = 5.$ $\|\vec{d}\| = \sqrt{1^2 + 1^2 + 0^2 + 1^2 + 0^2 + 1^2 + 1^2 + 1^2 1^2 + 0^2} = 2.64575131106 \ldots$ $\|\vec{c}\| = \sqrt{1^2 + \frac{1}{2}^2 + 1^2 + \frac{1}{2}^2 + \frac{1}{2}^2 1^2 + 1^2 + \frac{1}{2}^2 + \frac{1}{2}^2 + \frac{1}{2}^2} = 2.34520787991 \ldots$ $\frac{\vec{d} \cdot \vec{c}}{\|\vec{d}\| \times \|\vec{c}\|} = \frac{5}{2.64575131196 \ldots \times 2.34520787991 \ldots}$ $= 0.805822964025 \ldots$ The cosine similarity of vector 322A to centroid vector 324 is approximately 0.8058. Applying the same equation as applied to vector 322A and centroid vector 324, the cosine similarity of vector 322B to centroid vector 324 is approximately 0.8528. Therefore, vector 322B is more similar to centroid vector 324 than vector 322A is.

In block 208, a value representing the cohesion of cluster C is computed. According to an embodiment, cohesion of cluster C is the average of the similarities of the vector elements of cluster C to centroid vector $\vec{c}$. Equation 3 may be used to compute the cohesion of cluster C, according to an embodiment. In such an embodiment, the sum of the similarities computed using Equation 2 above is divided by the number of elements in cluster C to compute the cohesion of cluster C. However, other techniques for computing the cohesion of cluster C may be used in addition to, or instead of, the techniques described above.

$$\text{Cohesion}(C) = \sum \vec{d} \in C^{\text{similarity}(\vec{d}, \vec{c})} \qquad (3)$$

Continuing the example from above, the cohesion of cluster 326, as illustrated in FIG. 3, may be computed by summing the similarities and dividing by two, the number of elements in the cluster. Therefore, the cohesion of cluster $$326 \text{ is } \frac{0.8058 \ldots + .8528 \ldots}{2},$$

or approximately 0.829. This result quantifies the quality of the search results 312A and 312B with a single numerical value. For sake of simplicity, "cohesion" as used herein refers both to the approach for computing the numerical value that quantifies the quality of search results as well as to the numerical value itself.

Query Routing/Source Selection

Locating and accessing information in a continuously growing, distributed collection of information sources such as the Internet presents a difficult challenge to search engine providers. This challenge is especially difficult because users desire a single interface to handle their search queries. Thus, techniques for source selection and query routing have gained more attention in recent years. Query routing is the process of directing search queries to appropriate information sources by constraining the search space through source selection. The goal of a query routing system is to provide access to a potentially large and widely distributed collection of information sources by routing a search query to the information sources that can provide the most relevant search results.

Previous approaches to query routing attempt to infer the best search engine to respond to a query based on statistics of the terms contained in the query. CORI is one example of such an approach. CORI uses the document frequency df. However, CORI and other previous approaches do not take into account the quality of the search results to select the source search engines. For example, two source search engines A and B might have the same statistics for a given query, but search engine A might return better results than search engine B due to the properties of search engine A's ranking function. In such an approach that only employs statistics of terms, search engines A and B have the same ranking value for the purposes of query routing. Thus, previous approaches are not ideal solutions for query routing because these approaches do not take into account the quality of the search results.

Figure 4:
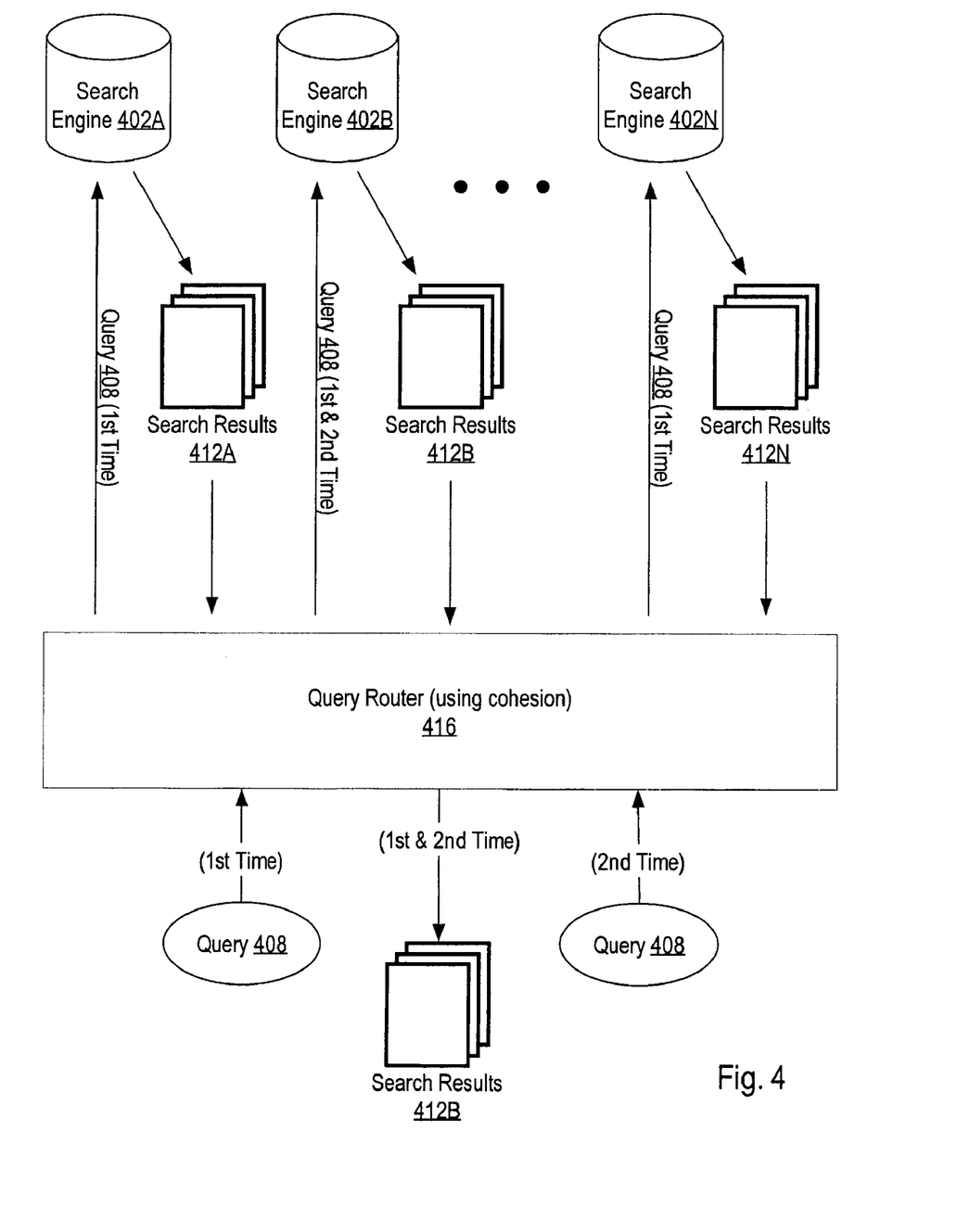
FIG. 4 is a block diagram that illustrates how cohesion may be applied by a query router for source selection, according to an embodiment.

FIG. 4 illustrates a system and method using cohesion to improve query routing by taking into account the quality of search results in the source selection process, according to an embodiment of the invention. The first time that query 408 is submitted to query router 416, query router 416 submits query 408 to each of the search engines 402A-N. Search engines 402A-N each return a set of search results 412A-N. Search results 402A-N may each be ranked by the respective ranking function associated with the search engine that returned the corresponding ranked search results. Query router 416 then computes the cohesion for each set of search results 412A-N and returns to the user the set of search results with the highest cohesion—in this example, search results 412B. The second and subsequent times that query 408 is submitted to query router 416, query router 416 submits query 408 to search engine 412B only. This is because search engine 402B returned the search results with the highest cohesion, and hence highest quality, the first time that query router 416 received query 408.

The functionality of query router 416 may be implemented on one or more computers. Query router 416 may be communicatively coupled to search engines 402A-N through a network. Alternatively, query router 416 may be a component of one of search engines 402A-N, in which case query router 416 functions to redirect query 408 to more appropriate search engines based on cohesion. Query router 416 may receive query 408 from a client computer that is communicatively coupled to query router 416 through a network. Alternatively, query router 416 may be a component of an application executing on a client computer. For example, query router 416 may be a component of a web browser application executing on the client computer.

Figure 5:
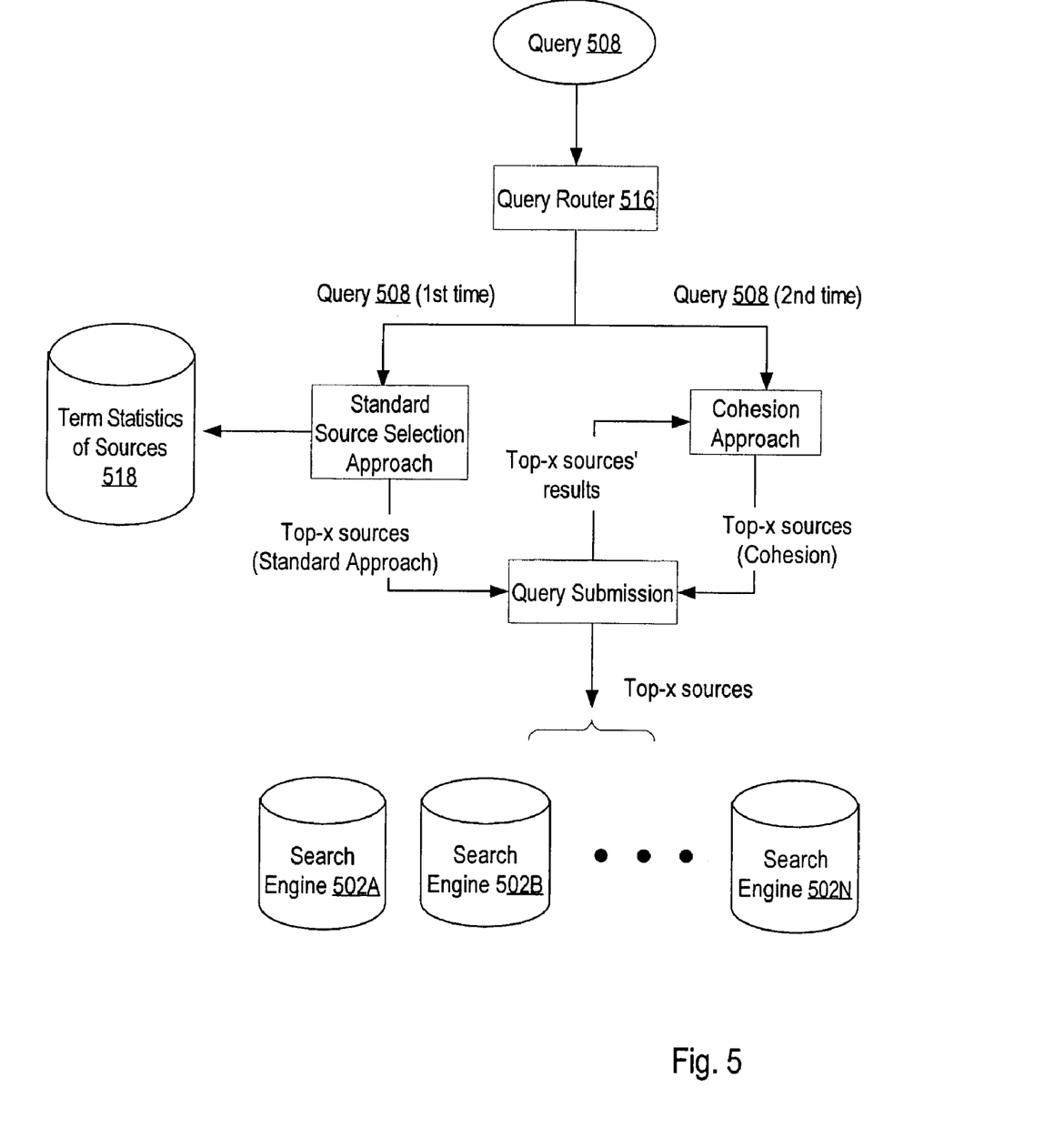
FIG. 5 is a block diagram that illustrates how cohesion may be applied by a query router for source selection where there are numerous source search engines to select from, according to an embodiment.

FIG. 5 illustrates a system and method using cohesion to improve the source selection process under circumstances in which (a) there are numerous source search engines from which to select and (b) submitting a query to all possible source search engines the first time that the query is received by the query router would be impractical. FIG. 5 illustrates search engines 502A-N, which may number into the hundreds or thousands or greater. The first time that query 508 is submitted to query router 516, query router 516 uses a standard approach for source selection, such as CORI, to select the top X source search engines from among search engines 502A-N, where X is a number smaller than the number of possible source search engines 402A-N (for example, twenty source search engines). The standard approach will provide query router 516 the top X source search engines based on statistics of query terms stored in database 518. Query router 516 will then submit query 508 to each of the top X source search engines provided by the standard approach. The top X source search engines each return search results to query router 516 in response to receiving query 508. Query router 516 may then quantify the quality of search results returned by the top X source search engines using cohesion and propose a new rank of the top X source search engines based on the quality of these results. Query router 516 may then use the new rank to select source search engines for subsequent submissions of query 508 to query router 516. For example, query router 516 may submit query 508 to only the highest ranked source search engine or some subset of the top X source search engines upon receiving query 508 for the second and subsequent times. Alternatively, query router 516 may use the cohesion-based ranking to merge the search results from the top X source search engines, or some subset thereof, into a single set of search results that are returned to the user.

Search Engine Aggregation/Meta-Search Engines

A meta-search engine or search engine aggregator is a type of search engine that submits user search queries to other search engines and returns the results or portions thereof from each of the other search engines. Meta-search engines enable a user to enter and submit a query once and obtain results from many information sources simultaneously. Cohesion may be applied in the context of meta-search engines to improve aggregation of search results obtained from many source search engines.

Figure 6:
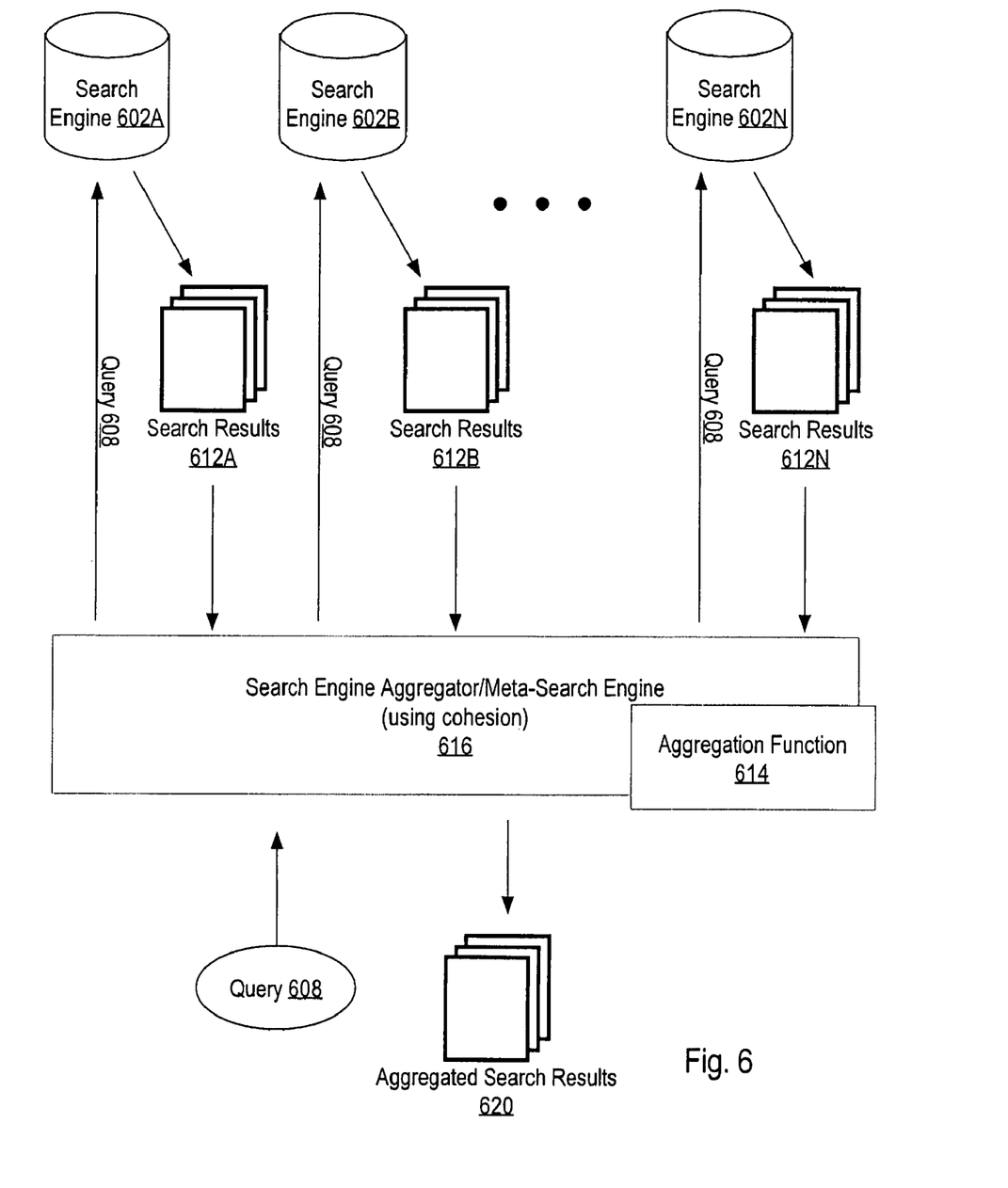
FIG. 6 is a block diagram that illustrates how cohesion may be applied by a meta-search engine to aggregate search results, according to an embodiment.

Referring to FIG. 6, a system and method are shown for applying cohesion in the context of search engine aggregation, according to an embodiment of the invention. Query 608 is submitted to search engine aggregator 616, which in turn submits query 608 to each of search engines 602A-N. Search engine aggregator 616 then receives multiple sets of search results 612A-N, one set from each of the search engines 602A-N. Search engine aggregator 616 then applies aggregation function 614 to the sets of search results 612A-N and presents an ordered set of aggregated search results 620 to the user.

A user or another computer may submit query 608 to search engine aggregator 616 over a network such as the Internet, a wide area network, or a local area Network. Alternatively, a user may submit query 608 to a program running locally on the user's computer that implements the functionality of search engine aggregator 616.

According to one embodiment of the invention, one function of search engine aggregator 616 is to aggregate search results obtained from multiple search engines in response to a query that a user submitted to search engine aggregator 616. The functionality of search engine aggregator 616 may be implemented on one or more computers. Search engine aggregator 616 may be a search engine like search engines 602A-N. Alternatively, search engine aggregator 616 may function solely to aggregate search results obtained from search engines 602A-N. Search engine aggregator 616 may exist on a network such as the Internet, a wide area network, or a local area network. Alternatively, search engine aggregator 616 may run as a program on the user's computer. Search engine aggregator 616 may implement the functionality of a query router, including using cohesion to select source search engines as described previously.

In one embodiment of the invention, search engine aggregator 616 employs aggregation function 614 to aggregate the sets of search results 612A-N obtained from search engines 602A-N. The result of the aggregation is returned to the user as aggregated search results 620. Similar to the manner in which a search engine employs a ranking function, search engine aggregator 616 may employ aggregation function 614 to order aggregated search results 620 before presenting the results to the user. Similar to the goal of a ranking function, the goal of aggregation function 614, in one embodiment of the invention, is to aggregate the sets of search results 612A-N in such a way that the most relevant results are presented to the user before less relevant results. Cohesion may be applied in a variety of useful applications in the context of search aggregation.

In one application, cohesion of aggregated search results 620 may be calculated to assess the quality of the aggregate ranking function for a given query against a given set of search engines. A first cohesion metric of a first set of aggregated search results 620 is calculated. Then, aggregation function 614 is tuned to produce a second set of aggregated search results 620 for the same query and against the same set of search engines. A second cohesion metric of the second set of aggregated search results is calculated. The first cohesion metric and the second cohesion metric are then compared to determine whether the adjustment made to aggregation function 614 improved or reduced the quality of the aggregated search results 620 returned in response to the query. This process may be repeated iteratively until the desired quality is achieved.

In another application, aggregation function 614 may use cohesion to produce aggregated search results 620. For example, aggregation function 614 may calculate the cohesion for each of the search results 612A-N obtained in response to query 608 submitted to each of the search engines 602A-N by search engine aggregator 616. Search engine aggregator 616 may then compute the cohesion of each set of search results 612A-N. Aggregation function 614 may then rank search results 612A-N according to the calculated cohesion metrics. Aggregation function 614 may then produce aggregated search results 620 by concatenating the top X results from each of the search results 612A-N in order of the rank assigned to each of the search results 612A-N. In this way, cohesion is used to merge search results from multiple search engines according to the quality of the search results.

Practical Issues

Cohesion enables the evaluation of the quality of results of search engines. When implementing a system that uses cohesion, there are some implementation issues to consider.

Cohesion computes the similarity across a set of results using the content of the text documents associated to the returned results. Thus, cohesion is computed with the greatest accuracy when access to the entire content of the documents is had. In a distributed system, the system computing cohesion may need to download the content of the documents, if those documents are not readily available. Having to download documents to compute cohesion may add to latency when processing a query. Alternatively, it is possible to use snippets of documents whenever available as they often come along with search results. Instead of downloading the entire content of the documents, the system computing cohesion may calculate cohesion using the snippets of documents sent along with the search results. While a cohesion metric calculated based on snippets of documents may not be as accurate as one calculated based on the full content of the documents such a metric still provides a useful indication of the quality of the search results because often the snippet is the portion of the document that the search engine considered to be most relevant to the user's search query.

For source selection, once a query router receives a query for the first time and processes the query, the query router may rank the sources according to their cohesion values. Thus, to be able to use this rank upon another occurrence of the same query, the query router stores this rank information. Using cohesion to select sources in a distributed system consequently requires the utilization of more memory space. Such an extra amount of memory can be minimized however. For example, by using integer identifiers to represent the sources, the rank of the sources for a query can be stored efficiently. Moreover, for most queries the number of sources worth storing will be small. Further, because query routers usually cache query results, the query router can store the rank of sources along with cached results. In this way, the query router keeps a rank of sources only for queries that have cached results.

Hardware Overview

Figure 7:
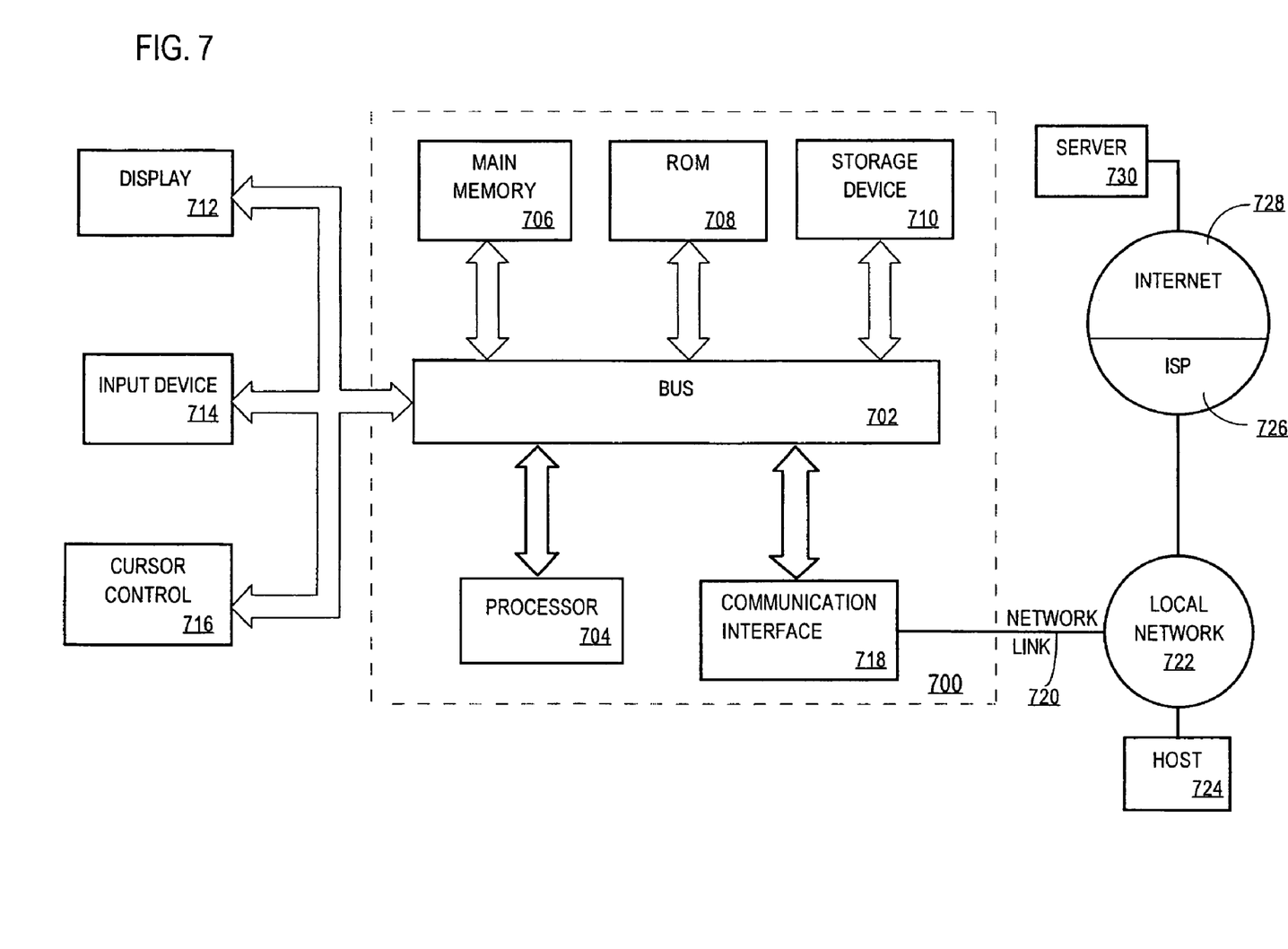
FIG. 7 is a block diagram that illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for evaluating a set of search results associated with a search engine, the method comprising:
   representing the set of search results associated with the search engine as a set of vectors, each vector in the set of vectors comprising one or more cells, each cell of the one or more cells of the vector having a cell value that corresponds to the frequency of a word from the set of search results in a search result that corresponds to the vector;
   computing a centroid vector based on the set of vectors, wherein said centroid vector represents a prototype search result;
   computing a cohesion metric, based on the set of vectors and the centroid vector, that quantifies the quality of the set of search results, wherein said cohesion metric represents the similarity between the set of search results to the prototype search result; and
   storing the cohesion metric in volatile or non-volatile memory.

2. The computer-implemented method of claim 1, wherein the set of search results is associated with a set of documents, and wherein each vector in the set of vectors represents a document in the set of documents.

3. The computer-implemented method of claim 2, wherein each of the one or more cells contained in each vector represents a word in the set of documents, each of the one or more cells having a cell value that represents, at least in part, the frequency of the word in a document in the set of documents.

4. The computer-implemented method of claim 3, wherein the word is a stemmed word.

5. The computer-implemented method of claim 1, wherein computing the centroid vector includes computing the average of the weights of the vectors in the set of vectors.

6. The computer-implemented method of claim 1, wherein computing the cohesion metric includes computing the average of the similarities between each vector in the set of vectors and the centroid vector.

7. The computer-implemented method of claim 6, wherein the similarity between the centroid vector and a vector in the set of vectors includes computing the cosine similarity of the centroid vector and the vector in the set of vectors.

8. The computer-implemented method of claim 1, further comprising:
   determining one or more search engines capable of responding to a search query, wherein at least one of the search engines is the search engine associated with the set of search results;
   selecting, based on the cohesion metric, the search engine associated with the search results to respond to the search query; and
   sending the search query to the search engine associated with set of search results.

9. The computer-implemented method of claim 8, wherein the search query contains one or more search terms, and wherein the determining the one or more search engines capable of responding to the search query includes determining, based on statistics of the one or more search terms stored in a database, the one or more search engines that are capable of responding to the search query.

10. A computer-implemented method for generating a set of meta-search results comprising, for each set of search results in a plurality of sets of search results:
   (a) representing the set of search results as a set of vectors, each vector in the set of vectors comprising one or more cells, each cell of the one or more cells of the vector having a cell value that corresponds to the frequency of a word from the set of search results in a search result that corresponds to the vector;
   (b) computing a centroid vector based on the set of vectors, wherein said centroid vector represents a prototype search result, (c) computing a cohesion metric, based on the set of vectors and the centroid vector, that quantifies the quality of the set of search results, wherein said cohesion metric represents the similarity between the set of search results to the prototype search result, and (d) storing the cohesion metric in volatile or non-volatile memory; generating a set of meta-search results comprising one or more search results from the sets of search results based on the cohesion metric computed for each set of search results.

11. The computer-implemented method of claim 10, wherein each set of search results in the plurality of sets of search results is associated with a different one of a plurality of search engines.

12. The computer-implemented method of claim 10, wherein the steps (a), (b), (c), and (d) performed for each set of search results in the plurality of sets of search results are performed in response to receiving the plurality of sets of search results from a plurality of search engines.

13. A machine-readable storage medium storing one or more sequences of instructions which, when executed by one or more processors, causes the one or more processors to perform the steps of:

representing a set of search results associated with a search engine as a set of vectors, each vector in the set of vectors comprising one or more cells, each cell of the one or more cells of the vector having a cell value that corresponds to the frequency of a word from the set of search results in a search result that corresponds to the vector;

computing a centroid vector based on the set of vectors, wherein said centroid vector represents a prototype search result;

computing a cohesion metric, based on the set of vectors and the centroid vector, that quantifies the quality of the set of search results, wherein said cohesion metric represents the similarity between the set of search results to the prototype search result; and storing the cohesion metric in volatile or non-volatile memory.

14. The machine-readable storage medium of claim 13, wherein the set of search results is associated with a set of documents, and wherein each vector in the set of vectors represents a document in the set of documents.

15. The machine-readable storage medium of claim 14, wherein each of the one or more cells contained in each vector represents a word in the set of documents, each of the one or more cells having a cell value that represents, at least in part, the frequency of the word in a document in the set of documents.

16. The machine-readable storage medium of claim 15, wherein the word is a stemmed word.

17. The machine-readable storage medium of claim 13, wherein computing the centroid vector includes computing the average of the weights of the vectors in the set of vectors.

18. The machine-readable storage medium of claim 13, wherein computing the cohesion metric includes computing the average of the similarities between each vector in the set of vectors and the centroid vector.

19. The machine-readable storage medium of claim 18, wherein the similarity between the centroid vector that represents a prototype search result and a vector in the set of vectors includes computing the cosine similarity of the centroid vector and the vector in the set of vectors.

20. The machine-readable storage medium of claim 13, wherein execution of the one or more sequences of instructions by the one or more processors causes the one or more processors to perform the steps of:

determining one or more search engines capable of responding to a search query, wherein at least one of the search engines is the search engine associated with the set of search results;

selecting, based on the cohesion metric that quantifies the quality of the set of search results, the search engine associated with the search results to respond to the search query; and sending the search query to the search engine associated with set of search results.

21. The machine-readable storage medium of claim 20, wherein the search query contains one or more search terms, and wherein the determining the one or more search engines capable of responding to the search query includes determining, based on statistics of the one or more search terms stored in a database, the one or more search engines that are capable of responding to the search query.

22. A machine-readable storage medium storing one or more sequences of instructions which, when executed by one or more processors, causes the one or more processors to perform the steps of:

for each set of search results in a plurality of sets of search results:
(a) representing the set of search results as a set of vectors, each vector in the set of vectors comprising one or more cells, each cell of the one or more cells of the vector having a cell value that corresponds to the frequency of a word from the set of search results in a search result that corresponds to the vector;
(b) computing a centroid vector based on the set of vectors, wherein said centroid vector represents a prototype search result,
(c) computing a cohesion metric, based on the set of vectors and the centroid vector, that quantifies the quality of the set of search results, wherein said cohesion metric represents similarity between the set of search results to the prototype search result, and
(d) storing the cohesion metric in volatile or non-volatile memory.

23. The machine-readable storage medium of claim 22, wherein each set of search results in the plurality of sets of search results is associated with a different one of a plurality of search engines.

24. The machine-readable storage medium of claim 22, wherein the steps (a), (b), (c), and (d) performed for each set of search results in the plurality of sets of search results are performed in response to receiving the plurality of sets of search results from a plurality of search engines.

* * * * *

UNITED STATES PATENT AND TRADEMARK OFFICE
CERTIFICATE OF CORRECTION

PATENT NO. : 7,720,870 B2  Page 1 of 1
APPLICATION NO. : 11/959182
DATED : May 18, 2010
INVENTOR(S) : Luciano Barbosa et al.

It is certified that error appears in the above-identified patent and that said Letters Patent is hereby corrected as shown below:

Claim 22, col. 18, line 48, replace "memory." with --memory;
generating a set of meta-search results comprising one or more search results from the sets of search results based on the cohesion metric computed for each set of search results.--

Signed and Sealed this

Fifth Day of October, 2010

David J. Kappos
*Director of the United States Patent and Trademark Office*